Nov. 1, 1966 R. B. LANKER 3,282,671
MOLD AND PLUNGER WITH INTERNAL COOLING STRUCTURE
Filed April 10, 1963 2 Sheets-Sheet 1

INVENTOR.
ROY B. LANKER
BY
ATTORNEYS

Nov. 1, 1966 — R. B. LANKER — 3,282,671
MOLD AND PLUNGER WITH INTERNAL COOLING STRUCTURE
Filed April 10, 1963 — 2 Sheets-Sheet 2

INVENTOR.
ROY B. LANKER
BY E. J. Holler &
W. A. Schaich
ATTORNEYS

United States Patent Office 3,282,671
Patented Nov. 1, 1966

3,282,671
MOLD AND PLUNGER WITH INTERNAL
COOLING STRUCTURE
Roy B. Lanker, Gahanna, Ohio, assignor to Owens-
Illinois, Inc., a corporation of Ohio
Filed Apr. 10, 1963, Ser. No. 272,094
9 Claims. (Cl. 65—319)

This invention relates to forming glass articles by pressing and particularly to forming glass articles having a substantially flat or concavo-convex base portion, a flange portion and a curved portion of relatively sharp radius connecting the base portion and flange portion, such as are found in the face plates of cathode ray tubes.

A major problem in the manufacture of such tubes which becomes critical in certain viewing applications is that there is a tendency for a deformation in the form of a continuous annular hump or locally raised portion to occur on the inner surface of the base portion at the periphery of the base portion adjacent the sharp radius portion. This condition is known in the art as "suck-up." This drastically interferes with viewing particularly in multi-color applications such as in color television.

It is an object of this invention to provide a method of obviating this "suck-up" condition.

It is a further object of this invention to provide a glass article having a base portion, flange portion and sharply curved radius portion connecting the base portion and flange portion wherein the base portion forms a substantially undistorted viewing area.

Figure 1:
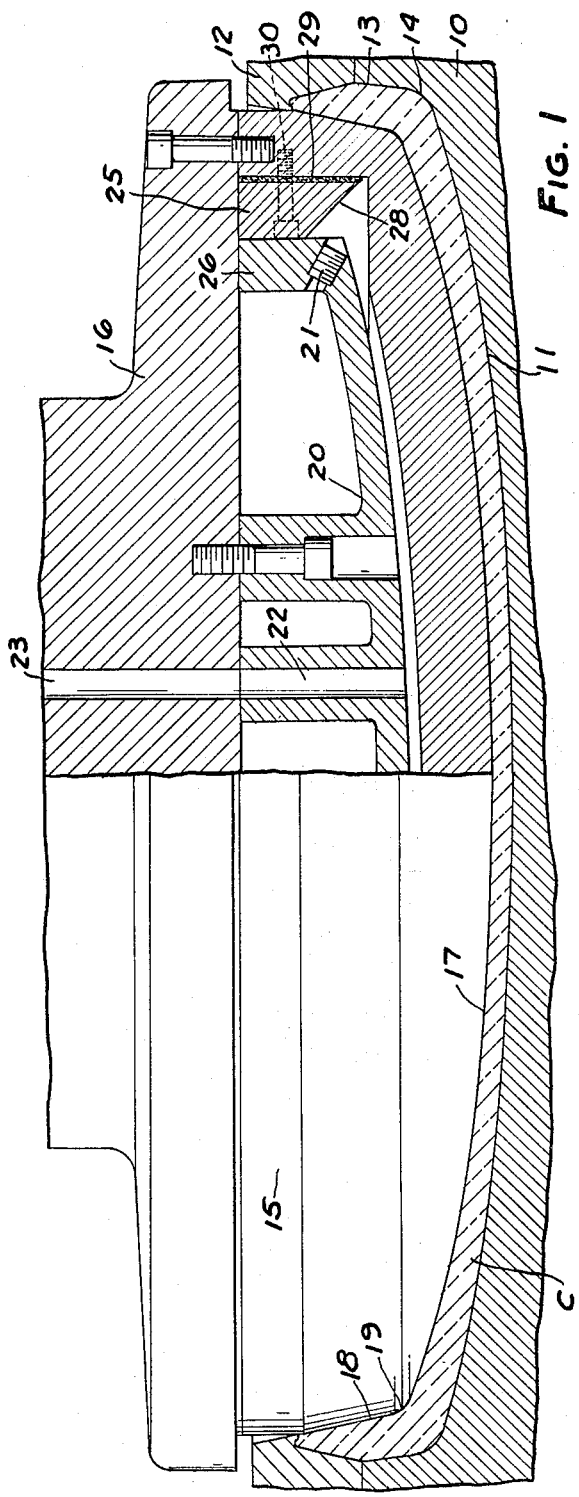
FIG. 1 is a fragmentary vertical sectional view of an apparatus for forming glass articles embodying the invention.

Referring to FIG. 1, the apparatus shown for pressing such a glass article comprises a mold 10 having a cavity which includes a substantially concave surface 11 that defines the outer surface of the base portion or panel C of the glass article that is to be formed. A shell ring 12 is provided adjacent the periphery of the mold 10 and cooperates with the mold 10 to define a surface 13 that forms the outer surface of the flange portion A of the glass article. Surface 11 merges with surface 13 at a surface 14 of sharply reduced radius to form the radius portion B of the glass article.

A plunger 15 is mounted on a head 16 and is adapted to be brought vertically downwardly and press the glass article in cooperation with the mold 10 and shell ring 12. The plunger 15 includes a base that has a convex surface 17 that forms the inner surface of the base portion C of the glass article and a flange that has a tapered peripheral surface 18 that forms the inner surface of the flange portion A of the glass article. Surfaces 17 and 18 merge at a surface portion 19 of sharply reduced radius that forms the inner surface of the radius portion B of the glass article.

The surface of the plunger 15 is adapted to be cooled by a liquid coolant supplied through a distributor 20 which has nozzles 21 along the periphery thereof that direct the coolant generally outwardly toward the sharp radius surface portion 19. The liquid flows radially inwardly and is removed through outlet openings 22 in the distribtuor and outlet openings 23 in the head 16.

A common defect in the pressing of glass articles which have a base portion and a flange poriton, such as the face plates of cathode ray tubes, comprises a substantially continuous annular hump or locally raised portion on the inner surface of the base portion at the periphery of the base portion adjacent the sharp radius prtion. Such a defect, known in the art as "suck-up," interferes with viewing through the base portion and substantially affects the use of the article as a face plate for cathode ray tubes particularly in multi-color television or similar critical applications.

In accordance with the invention, the "suck-up" condition at the peripheral edge of the base portion C of the glass article is obviated by maintaining the plunger surface temperature such that the temperature of the plunger surface 17 that forms the base portion C is near, but above, the crizzle temperature of the glass and the temperature of the sharp radius surface portion 19 that forms the radius area B of the glass article and the temperature of the flange surface 18 of the plunger that forms the flange or skirt area A of the glass article is near, but below, the sticking temperature of the glass.

It has been found that when such temperature relationships are maintained, the "suck-up" condition is eliminated and a substantially distortion-free base portion C is provided which can form a viewing panel for cathode ray tubes wherein the base portion C is generally of concavo-convex configuration.

Referring to FIG. 1, the desired temperature relationships are insured by providing an annular metal insert or baffle 25 in the space between the peripheral wall 26 of the distributor 20 and the inner surface of the flange portion of the plunger. The baffle 25 is supported in the plunger 15 by bolts 30 and substantially fills the space between the periphery 26 and the flange of the plunger and prevents liquid coolant from entering this space. An insulating gasket 29 of asbestos or the like is interposed between baffle 28 and the inner surface of the flange of plunger 13. The lower edge surface 28 of the baffle 25 extends diagonally downwardly and outwardly to permit liquid coolant to flow to a portion of the surface 19 of the plunger that joins the base of the plunger to the flange of the plunger.

Figure 4:
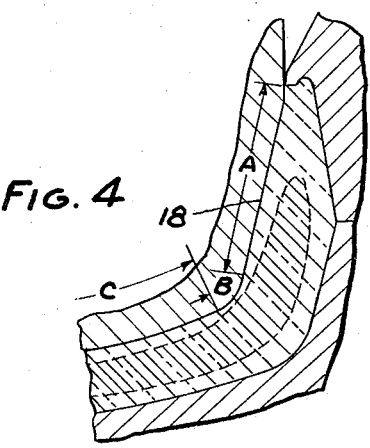
FIG. 4 is a partly diagrammatic sectional view on an enlarged scale of a portion of an apparatus showing the manner in which glass articles are formed in accordance with the prior art.
Figure 5:
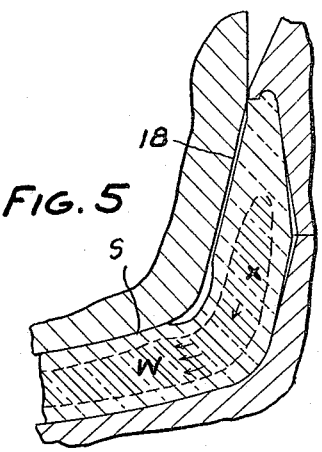
FIG. 5 is a view similar to FIG. 4 showing the parts in a slightly different position during withdrawing of the plunger.

Although I do not wish to be bound by the theory involved, in my opinion, the satisfactory results achieved are due to the following theory:

FIGS. 4 and 5 show partly diagrammatically the forming of a glass article in accordance with the prior art methods which result in the formation of a "suck-up" condition in the glass article. FIG. 4 shows a cross section of the mold equipment and glass at the completion of fill and prior to retraction of the plunger. FIG. 5 shows exactly the same cross-sectional area but includes a line showing the plunger retracted slightly from the lowermost pressing position.

A shaded area in the glass cross section indicates the general shape and position of the core of glass which is still at high temperature and therefore has a low viscosity.

At the instant the plunger 15 starts moving upward, the glass in the skirt or flange area A contacted by plunger surface 19 is stripped from the plunger. The release of the glass from the plunger skirt is the result of almost pure shear stress at the glass-metal interface and very little plunger movement is required to effect complete release. The action might be compared to removing one magnet from the face of another by sliding the magnets sideways rather than trying to pull them apart.

This release by the mechanism of shear changes rapidly around the blend radius area B contacted by the plunger surface 19 of sharp radius. It changes from nearly all shear at the juncture of blend radius area B and skirt area A to no shear at the juncture of blend radius area B and panel area C. Even under these conditions, the glass at the blend radius area B strips from the plunger almost simultaneously with area A. This is because the surface glass at the blend radius area B assumes a structural shape which cannot be easily distorted, even though it is actually only a thin skin of rigid glass. Thus, when the glass area A strips from the flange, it also strips the plunger partially at the blend radius area B because of shear. It strips the remainder of the way around the blend radius area B because of the rigidity of the structural shape of the glass skin at the blend radius area B.

The glass area C contacting the base surface 17 of the plunger does not release at this time. The adhesive forces are such that the skin of the glass in this area C actually moves upward with the plunger. As compared to the skirt area A and using the same analogy, the glass in this area C is stripped from the plunger in much the same manner as two magnets are pulled apart rather than slid apart.

Referring to FIG. 5, as the plunger 15 moves upward with panel or base portion C of the glass article adhering to it, a low pressure area is created in the core glass (shaded) wherever the glass is still adhering to the plunger. Glass from the viscous glass core in the skirt area A flows into this area. The long arrow shows glass flow from X into W. Thus, the adhesion of the glass to the panel area C of the plunger actually forces glass from the skirt area A into the base or panel area C of the glass article.

As the volume of core glass in the skirt A is reduced by this flow, the surface of the glass previously stripped from the plunger shrinks laterally away from the plunger, conforming to the new skirt glass volume. The glass in the blend radius area B also shrinks away from the plunger and retains its shape. As shown in FIG. 5, both the inside and outside surfaces at area A and B shrink away. In addition, the glass core assumes a new shape as shown in the shaded area. As the plunger continues to retract, the panel glass C strips from the plunger when the adhesive forces are overcome by the glass viscosity and resistance to flow.

For purposes of clarity, FIGS. 4 and 5 are highly exaggerated as to plunger movement and suck-up intensity. It must be realized that this all happens in the first few thousandths of an inch of upward plunger movement. The actual volume of glass flow during suck-up formation is very small.

It is evident that this explanation of the defect of suck-up as obtained prior to this invention is dependent upon the fact that the glass does not release from the panel surface of the mold. Otherwise, the reduction in pressure in specific areas of the glass core would not occur. It is believed that there are two basic reasons why the glass does not release from the mold panel surface 17 and radius surface 19, namely: the core glass is of such a viscosity that the upward forces exerted by the plunger are not transmitted through the panel and flow of core glass from areas unaffected by continued plunger movement occurs instead; and the adhesive force acting between mold and glass are greater than those between plunger and glass.

Figure 6:
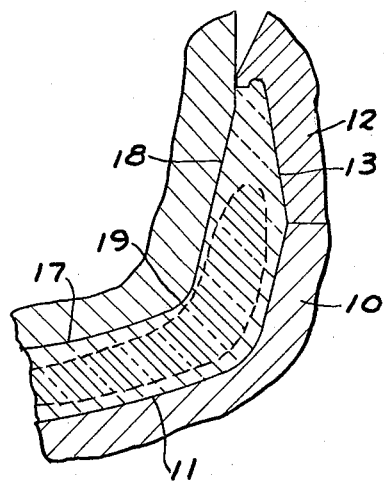
FIG. 6 is a partly diagrammatic sectional view on an enlarged scale of a portion of the apparatus shown in FIG. 1 showing the manner in which a glass article is formed in accordance with the invention.
Figure 7:
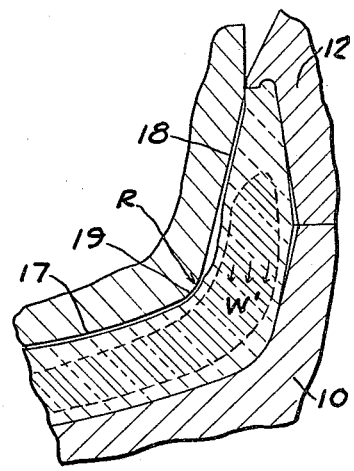
FIG. 7 is a view similar to FIG. 5 showing the plunger withdrawn.

The theory of the formation of a glass article in accordance with the invention may be understood by reference to FIGS. 6 and 7.

As shown in FIG. 6, the invention results in a much larger reservoir of core glass in the skirt area A as shown by the shaded area. This increase in volume of hot glass is attributed to the increased surface temperature of the skirt or flange surface 18 and radius surface 19 of the plunger.

FIG. 7 is identical to FIG. 6 except that a line indicating plunger retraction has been added.

The theory previously described for suck-up formation prevails in this instance with one important difference. The increased plunger skirt temperature prevents the glass from stripping from the plunger skirt surface 18 immediately at the start of plunger vertical movement. The glass strips a part of the way down the skirt surface 18 but does not strip away in the lower skirt area R nor does it strip from the plunger radius surface 19. The net result is a change in the position of the low pressure area W. This area has been moved from the edge of the panel section C as shown in FIG. 5 to the blend of the skirt A and radius B in FIG. 7.

This change in position of the low pressure area drastically reduces the reservoir of fluid core glass. Thus, the resistance to flow increases rapidly and results in the glass "snapping" off the plunger in a single action rather than stripping off progressively as in the case of the prior art method, as described above with reference to FIGS. 4 and 5 before.

Since the glass remains adhered to the flange surface 18 of the plunger as well as completely around the radius surface 19 until this sharp release, there is substantially no possibility of suck-up formation by lateral movement of the radius glass as described above. The glass surface remains essentially identical in shape to that of the plunger.

Figure 3:
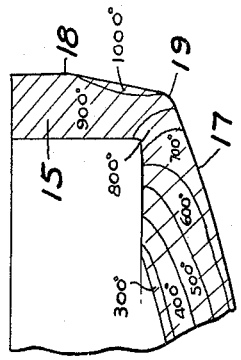
FIG. 3 is a view similar to FIG. 2 showing the isothermal distribution in a glass article made in accordance with the invention.
Figure 2:
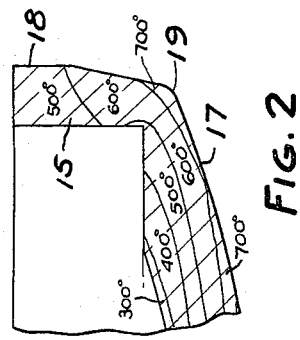
FIG. 2 is a partly diagrammatic vertical sectional view through a glass article made by prior art methods showing the isothermal distribution during the pressing.

FIGS. 2 and 3 are representative, partly diagrammatic, isothermal patterns of portions of the plungers during pressing in accordance with the prior art and the invention respectively. It is noted that there are substantial differences in the thermal balance and surface temperatures in the skirt 18 and radius areas 19. The surface temperature on the skirt 18 of the plunger (FIG. 3) revised to minimize suck-up is approximately 400° F. higher than that in the corresponding area of the standard plunger (FIG. 3). This high surface temperature in the skirt and rim radius area is the major factor in minimizing suck-up.

Thus, according to the invention, the temperatures of the plunger skirt surface 18 and radius surface 19 are maintained in such a range that the tendency of the glass to adhere to these surfaces of the plunger is greater than the shear forces exerted by the upward movement of the plunger.

This temperature balance can be obtained by several methods as may occur to persons skilled in the art. As shown in FIG. 1, a baffle 25 is provided. By this arrangement, existing plungers can be modified to eliminate the suck-up condition.

Similar results can be obtained by metal thickness changes designed to change the heat transfer through the plunger surfaces. Alternatively, the plunger coolant can be directed preferentially to achieve the desired temperature balance, that is, cooling the base surface 17 so that it is near the crizzle point of the glass and cooling the flange surface 18 and radius surface 19 less or not at all so that they are near the sticking temperature of the glass.

I claim:

1. An apparatus for forming a glass article having one portion connected to the other by a curved portion of small radius comprising a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface, means for circulating a liquid coolant across said internal surface to continuously remove heat and cool the plunger, and means positioned adjacent the internal surface of the flange portion of said plunger and preventing the direct impingement of liquid coolant against the internal surface of the flange portion of the plunger in such a manner that the temperature of the external surface of the flange portion of the plunger and the external surface of the sharply curved portion of the plunger are maintained near but below the glass sticking temperature and the temperature of the external surface of the base portion of the plunger is maintained near but above the glass crizzle temperature.

2. An apparatus for forming a glass article having one portion connected to the other by a curved portion of small radius comprising a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and means for circulating a liquid coolant across said internal surface to continuously remove heat and cool the plunger, and means for preventing the liquid coolant from excessive cooling of the flange portion of the plunger in such a manner that the temperature of the external surface of the flange portion of the plunger and the external surface of the sharply curved portion of the plunger are maintained near but below the glass sticking temperature and the temperature of the external surface of the base portion of the plunger is maintained near but above the glass crizzle temperature.

3. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and means for circulating a liquid coolant across said internal surface to continuously remove heat and cool the plunger, the improvement which comprises
a baffle positioned adjacent the internal surface of the flange portion of said plunger and preventing the direct impingement of liquid coolant against the internal surface of the flange portion of the plunger in such a manner that the temperature of the external surface of the flange portion of the plunger and the external surface of the shaply curved portion of the plunger are maintained near but below the glass sticking temperature and the temperature of the external surface of the base portion of the plunger is maintained near but above the glass crizzle temperature.

4. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and means for circulating a liquid coolant across said internal surface to continuously remove heat and cool the plunger, the improvement which comprises
a baffle positioned adjacent the internal surface of the flange portion of said plunger and an insulating gasket interposed between the baffle and the internal surface of the flange portion of the plunger and preventing the direct impingement of liquid coolant against the internal surface of the flange portion of the plunger in such a manner that the temperature of the external surface of the flange portion of the plunger and the external surface of the sharply curved portion of the plunger are maintained near but below the glass sticking temperature and the temperature of the external surface of the base portion of the plunger is maintained near but above the glass crizzle temperature.

5. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and header means spaced from the internal surface of said plunger for circulating a liquid coolant across said internal surface to continuously remove heat and cool the plunger, the improvement which comprises
a baffle substantially filling the space between the header means and the internal surface of the flange portion of said plunger and preventing the direct impingement of liquid coolant against the internal surface of the flange portion of the plunger in such a manner that the temperature of the external surface of the flange portion of the plunger and the external surface of the sharply curved portion of the plunger are maintained near but below the glass sticking temperature and the temperature of the external surface of the base portion of the plunger is maintained near but above the glass crizzle temperature.

6. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and header means spaced from the internal surface of said plunger for circulating a liquid coolant across said internal surface to continuously remove heat and cool the plunger, the improvement which comprises
a baffle mounted on the internal surface of the flange portion of said plunger and substantially filling the space between the header means and the internal surface of the flange portion of said plunger and preventing the direct impingement of liquid coolant against the internal surface of the flange portion of the plunger in such a manner that the temperature of the external surface of the flange portion of the plunger and the external surface of the sharply curved portion of the plunger are maintained near but below the glass sticking temperature and the temperature of the external surface of the base portion of the plunger is maintained near but above the glass crizzle temperature.

7. The combination set forth in claim 6 including an insulating gasket interposed between the baffle and the internal surface of the flange portion of the plunger.

8. The combination set forth in claim 7 wherein the lower end of said baffle is beveled toward the portion of the internal surface of the plunger which connects the flange portion of the plunger to the base portion of the plunger.

9. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and means for circulating a liquid coolant across said internal surface to continuously remove heat and cool the plunger, the improvement which comprises a baffle positioned adjacent the internal surface of the flange portion of said plunger, the lower end of said baffle being beveled toward the portion of the internal surface of the flange portion of the plunger which connects the flange portion to the base portion of the plunger, said baffle preventing the direct impingement of liquid coolant against the internal surface of the flange portion of the plunger in such a manner that the temperature of the external surface of the flange portion of the plunger and the external surface of the sharply curved portion of the plunger are maintained near but below the glass sticking temperature and the temperature of the external surface of the base portion of the plunger is maintained near but above the glass crizzle temperature.

References Cited by the Examiner
UNITED STATES PATENTS
3,078,696  2/1963  Torok _____ 65—362 X DONALL H. SYLVESTER, *Primary Examiner.*
A. D. KELLOGG, *Assistant Examiner.*